United States Patent [19]
Sindhu et al.

[11] Patent Number: 5,905,725
[45] Date of Patent: May 18, 1999

[54] HIGH SPEED SWITCHING DEVICE

[75] Inventors: Pradeep S. Sindhu, Mountain View; Ramalingam K. Anand, San Jose; Dennis C. Ferguson, Mountain View; Bjorn O. Liencres, Palo Alto, all of Calif.

[73] Assignee: Juniper Networks, Santa Clara, Calif.

[21] Appl. No.: 08/844,171

[22] Filed: Apr. 18, 1997

Related U.S. Application Data

[63] Continuation-in-part of application No. 08/767,576, Dec. 16, 1996.

[51] Int. Cl.$^6$ .................................................. H04L 12/56
[52] U.S. Cl. ........................................ 370/389; 370/395
[58] Field of Search .................................. 370/395, 389, 370/396, 397, 351, 352, 354, 355, 428, 412, 429, 413–418, 442, 368, 363, 353, 398, 399, 401, 475

[56] References Cited

U.S. PATENT DOCUMENTS

| | | | |
|---|---|---|---|
| 5,448,702 | 9/1995 | Garcia | 395/325 |
| 5,457,687 | 10/1995 | Newman | 370/85.3 |
| 5,491,694 | 2/1996 | Oliver et al. | 370/461 |
| 5,521,910 | 5/1996 | Matthews | 370/54 |

*Primary Examiner*—Dang Ton
*Attorney, Agent, or Firm*—Fish & Richardson P.C.

[57] ABSTRACT

A router for switching a data packet between a source and destination in a network including a plurality of input ports each including a data handler. The data handler divides a data packet into one or more fixed length cells. The router includes a plurality of output ports at least one of which is for routing the data packet to the destination and a memory divided into a plurality of memory banks. A input switch receives fixed length cells from the input ports and writes a single cell in a cell slot time span to each memory bank. An output switch routes cells received from the memory to an appropriate output port.

25 Claims, 18 Drawing Sheets

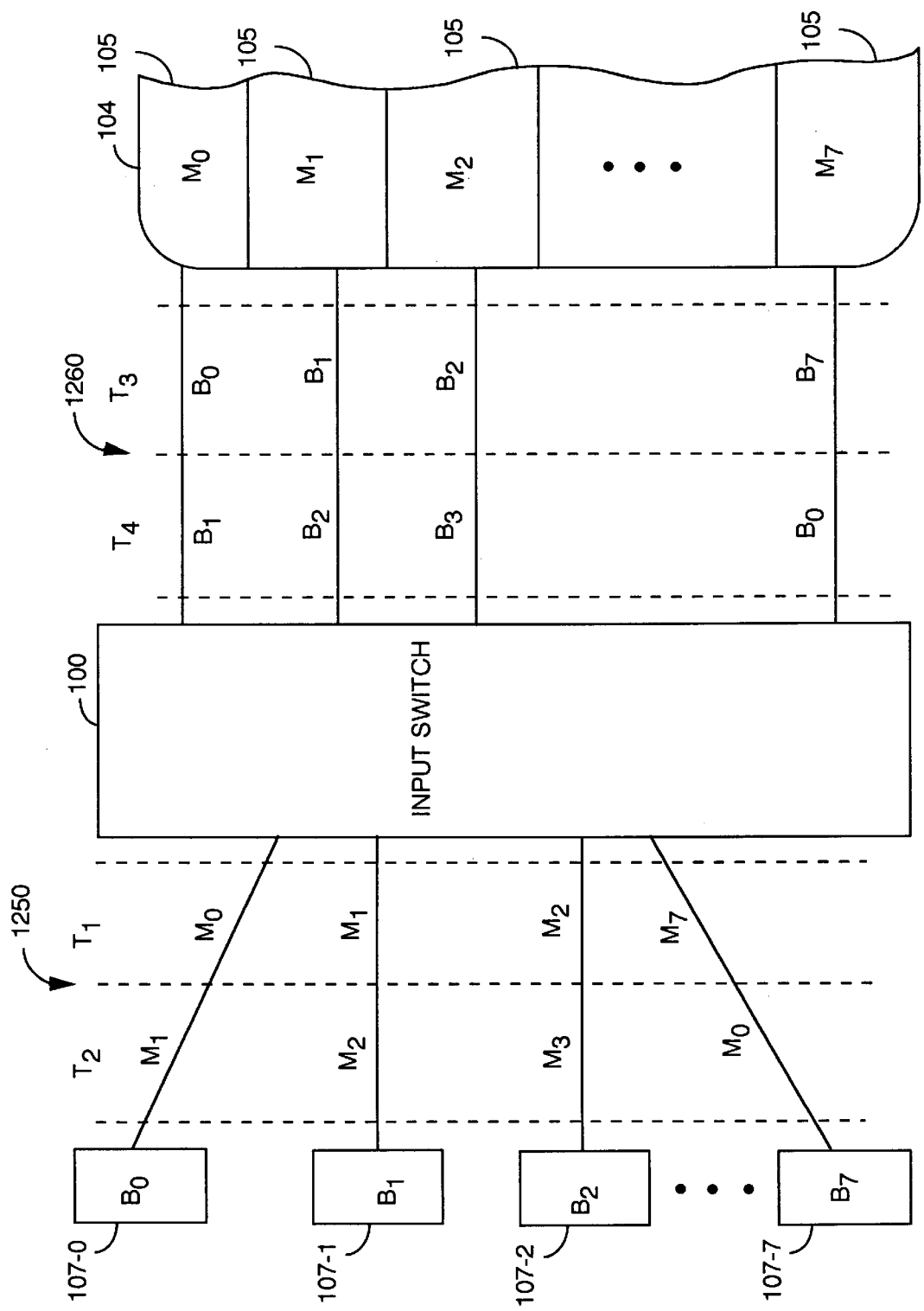

HIGH SPEED SWITCHING DEVICE

This is a continuation-in-part of U.S. application Ser. No. 08/767,576, entitled "HIGH SPEED VARIABLE LENGTH BEST MATCH LOOK-UP IN A SWITCHING DEVICE", filed on Dec. 16, 1996.

BACKGROUND

The present invention relates generally to data routing systems, and more particularly to a method and apparatus for routing packets through a network.

In packet switch communication systems, a router is a switching device which receives packets containing data or control information on one port, and based on destination information contained within the packet, routes the packet out another port to the destination (or intermediary destination).

Conventional routers perform this switching function by evaluating header information contained within a first data block in the packet in order to determine the proper output port for a particular packet.

Efficient switching of packets through the router is of paramount concern. Referring now to FIG. 1a, a conventional router includes a plurality of input ports 2 each including an input buffer (memory) 4, a switching device 6 and a plurality of output ports 8.

Data packets received at an input port 2 are stored at least temporarily, in input buffer 4 while destination information associated with each packet is decoded to determine the appropriate switching through the switching device 6. Obviously, if the decoding process takes too long as compared to the rate at which packets are received, a larger memory element will be required. In addition, the packet may be forced to remain in the input buffer after the destination information is decoded if the switching device cannot make the connection. Blocking refers to a condition in which a connection cannot be made in the switch due to the unavailability of the desired output port (the port is busy, e.g., routing another packet from a different input port). The size of each input buffer 4 is dependent on a number of factors including: the line input rate, the speed of the look-up process, and the blocking characteristics for the switching device.

Unfortunately, these types of routers are inefficient in a number of respects. Each input port includes a dedicated input buffer and memory sharing between input ports is not provided for in the design. Each input buffer must be sized to meet the maximum throughput requirements for a given port. However, design trades (cost) often necessitate smaller buffers for each port. With the smaller buffers, the possibility arises for packets to be dropped due to blocking conditions. While excess memory capacity typically existed in the router (due to the varied usage of the input ports), no means for taking advantage of the excess is afforded.

To prevent the dropping of packets, designers developed "non-blocking" routers. Referring now to FIG. 1b, a conventional "non-blocking" router includes a plurality of input ports 2 each including an input buffer (memory) 4, a switching device 6 and a plurality of output ports 8 each having an output buffer 9. In order to avoid blocking conditions, each output port 8 was configured to include an output buffer 9. Each output port could simultaneously be outputting packets as well as receiving new packets for output at a later time. If the size of the output buffer was sufficiently large, then no data packets would be dropped.

However, these designs are even more inefficient in terms of memory capacity and cost. Again, each output port includes a dedicated output buffer and memory sharing between output ports is not provided for in the design. Each output buffer must be sized to meet the maximum throughput requirements for a given port (in order to maintain its "non-blocking" characteristics). Even more excess memory capacity typically exists in the router (due to the varied usage of the input ports and output ports), yet no means for taking advantage of the excess is afforded. Twice the amount and bandwidth of memory has to be used than required to support the amount of data being moved through these types of devices.

SUMMARY OF THE INVENTION

In general, in one aspect, the invention provides a router for switching a data packet between a source and destination in a network including a plurality of input ports each including a data handler. The data handler divides a data packet into one or more fixed length cells. The router includes a plurality of output ports at least one of which is for routing the data packet to the destination and a memory divided into a plurality of memory banks. A input switch receives fixed length cells from the input ports and writes a single cell in a cell slot time span to each memory bank. An output switch routes cells received from the memory to an appropriate output port.

Aspects of the invention include the following features. The input switch includes a linking engine for linking cells in the data packet to allow retrieval of the data packet from non-contiguous locations in the memory. The router further includes an indirect cell generator for generating one or more indirect cells. The linking engine tracks the location in the memory where consecutive cells of the data packet are stored and provides an address in memory of each cell in the data packet for storage in indirect cells.

The input switch time division multiplexes the writing of data packets to the memory such that consecutive cells from the input port are written to consecutive banks in the memory. The input switch includes a key reading engine for extracting key information from a first cell received at the input switch associated with the data packet. The router further includes a controller coupled to the input switch for receiving the key information therefrom. The controller decodes destination information from the key information received from the input switch and outputs a notification defining a routing of the data packet from the memory to the output port.

The output port includes a result processor for receiving the notification from the controller and initiates a transfer of the data packet from the memory to the output port. The input switch includes a reservation table for scheduling transfers from the memory to the output switch. The output switch routes the notification to the output port and thereafter the output port issues a request to the input switch to transfer the data packet from memory to the output port through the output switch. The request from the output port is stored in the reservation table. The requests to transfer cells from memory to the output switch are time domain multiplexed so that during one cell slot time span at most a single read request is issued to each bank in the memory for servicing. The memory outputs at most a single cell per bank in one cell slot time span.

One advantage of the invention is that packets may be switched through the router at line rates without requiring the storage of the packets in expensive high speed memory by providing a switching architecture that efficiently manages and routes packets through the switch.

Other advantages and features will be apparent from the following description and claims.

BRIEF DESCRIPTION OF THE DRAWINGS

FIG. 11b is a schematic block diagram of a router including the timing and ordering of transfers from the input port to memory according to one embodiment of the present invention.

DETAILED DESCRIPTION

Figure 1A:
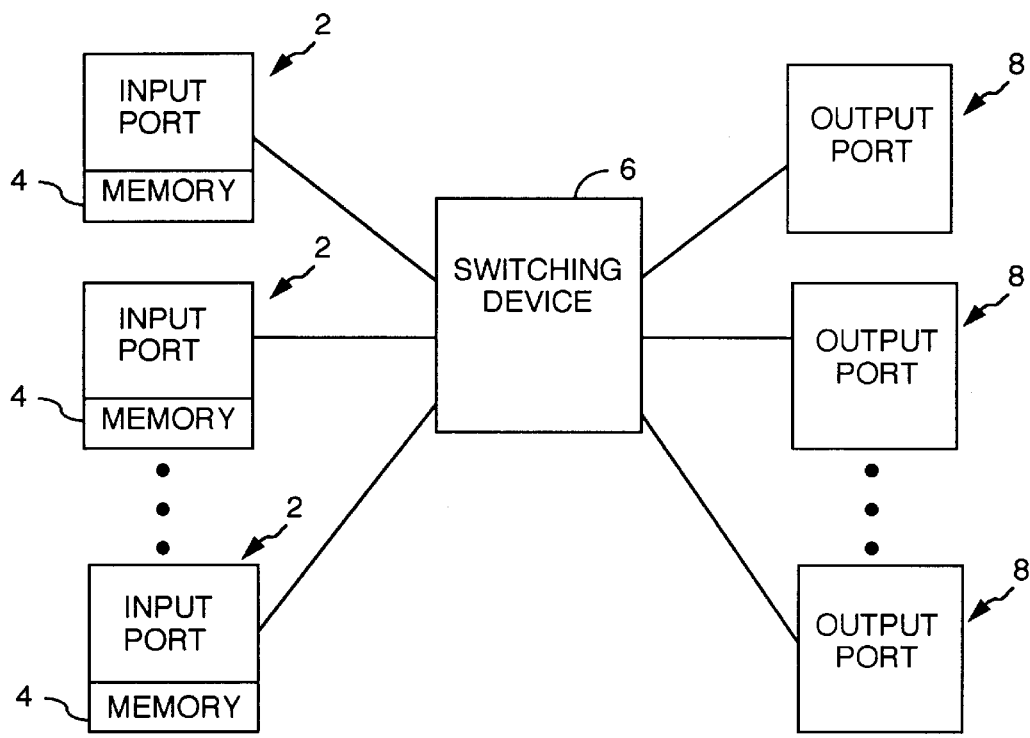
FIGS. 1a and 1b are block diagrams of conventional router devices.
Figure 1B:
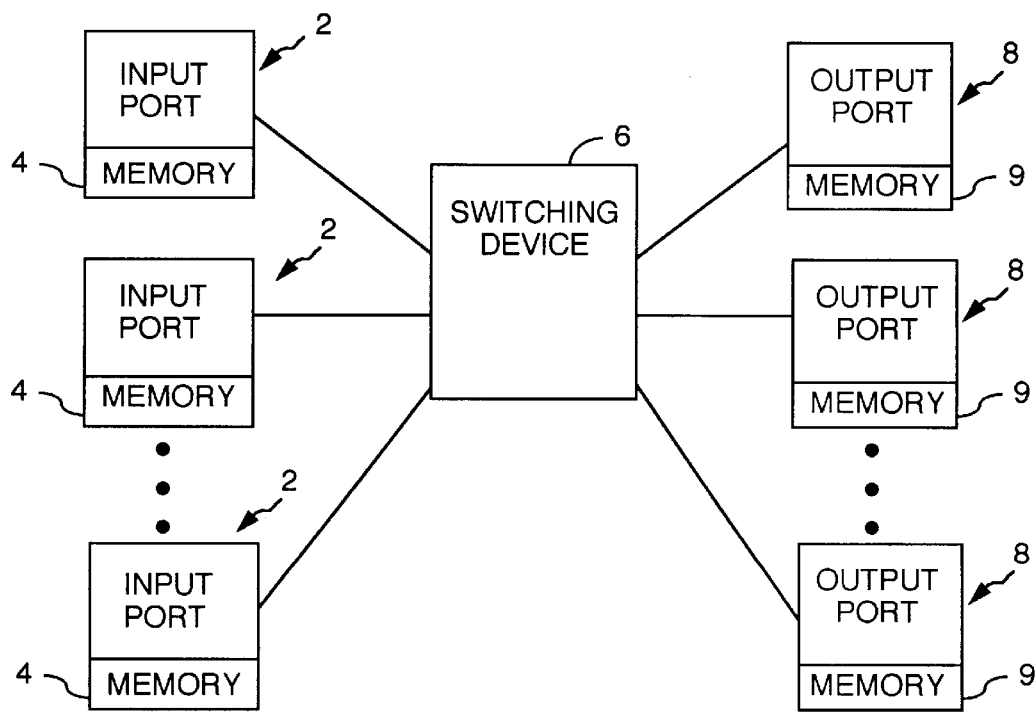
Figure 2A:
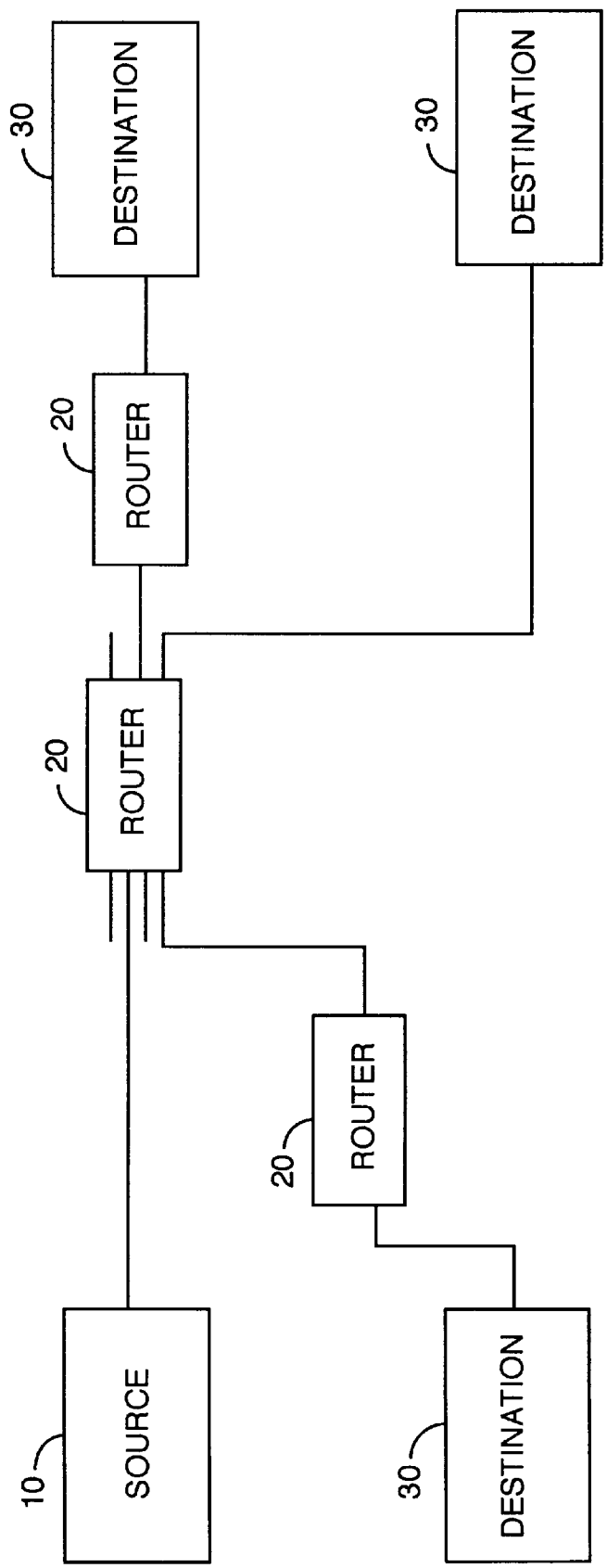
FIG. 2a is a schematic block diagram of a data routing system according to one embodiment of the present invention.

Referring to FIG. 2a, in a packet switching system, a source 10 is connected to one or more routers 20 for transmitting packets to one or more destinations 30. Each router includes a plurality of ports that are connected to various sources and destinations. A packet from source 10 may pass through more than one router 20 prior to arriving at its destination.

Figure 2B:
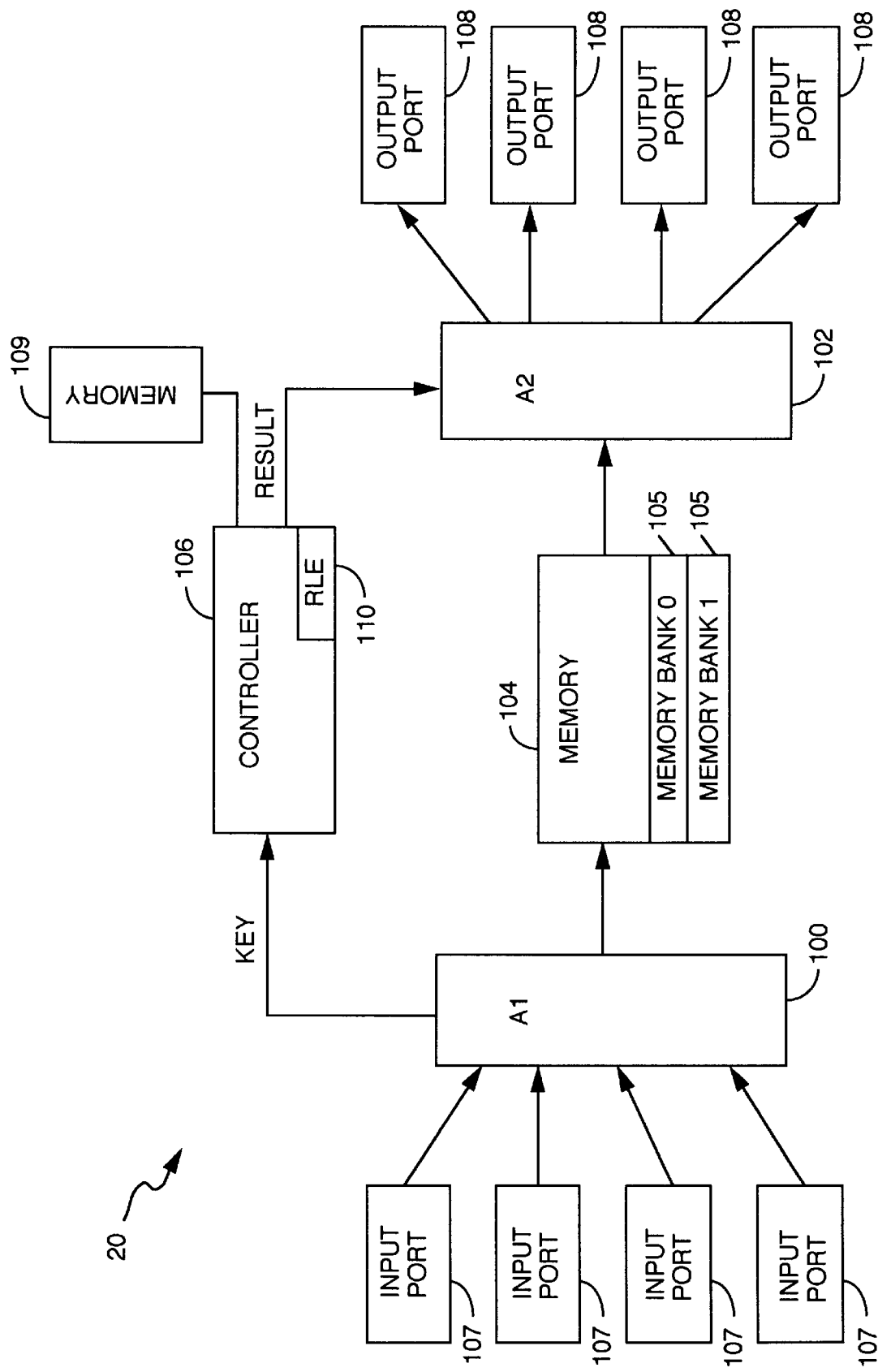
FIG. 2b is a schematic block diagram of a router according to one embodiment of the present invention.

Referring to FIG. 2b, each router 20 includes an input switch 100, an output switch 102, a memory 104 including one or more memory banks 105, a controller 106 and a plurality of input and output ports 107 and 108, respectively. Associated with the controller 106 is controller memory 109 for storing a routing table. Input switch 100 is connected to each input port 107, while output switch 102 is connected to each output port 108 in router 20. In one embodiment, router 20 includes eight input and output ports 107 and 108, respectively.

In operation, packets are received at an input port 107, transferred to input switch 100 and stored temporarily in memory 104. When the packet is received by switch 100, a key is read from the first data block in the packet and transferred to controller 106. The key contains destination information which is derived from the header field associated with the first block of data in a packet and other information (source ID, flow ID, etc.).

A route look-up engine 110 in controller 106 performs a trie based search based on the key information and returns a result which includes the output port associated with the destination. The result is coupled with other information (source ID, flow ID, packet length, etc.) for routing the packet through router 20 and provided as a notification from controller 106 to output switch 102. Output switch 102 transfers the notification to the identified output port 108. Upon receiving the notification information, the output port 108 initiates the transfer of the packet from memory 104 through output switch 102 back to the appropriate output port 108.

Figure 3:
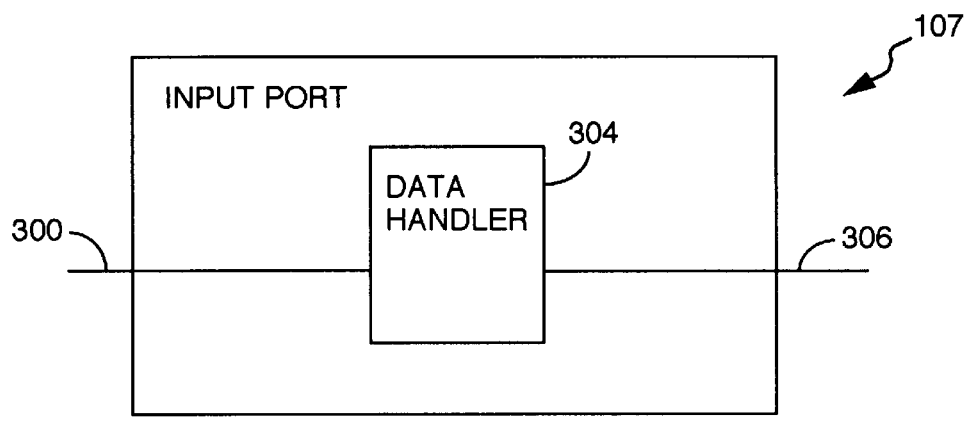
FIG. 3 is a schematic block diagram of an input port according to one embodiment of the present invention.

Referring to FIG. 3, each input port 107 includes a line input interface 300, a data handler 304 and a cell output port 306. Packets are received at line input interface 300. As the packets are received, data handler 302 divides the packets received into fixed lengths cells. In one embodiment of the present invention, the length of each cell is 80 bytes, with 16 bytes of internal header (control information) and 64 bytes of cell data. As the data handler divides the incoming packet into fixed length cells, it synchronously outputs the cells to input switch 100 through cell output port 306.

Figure 4A:
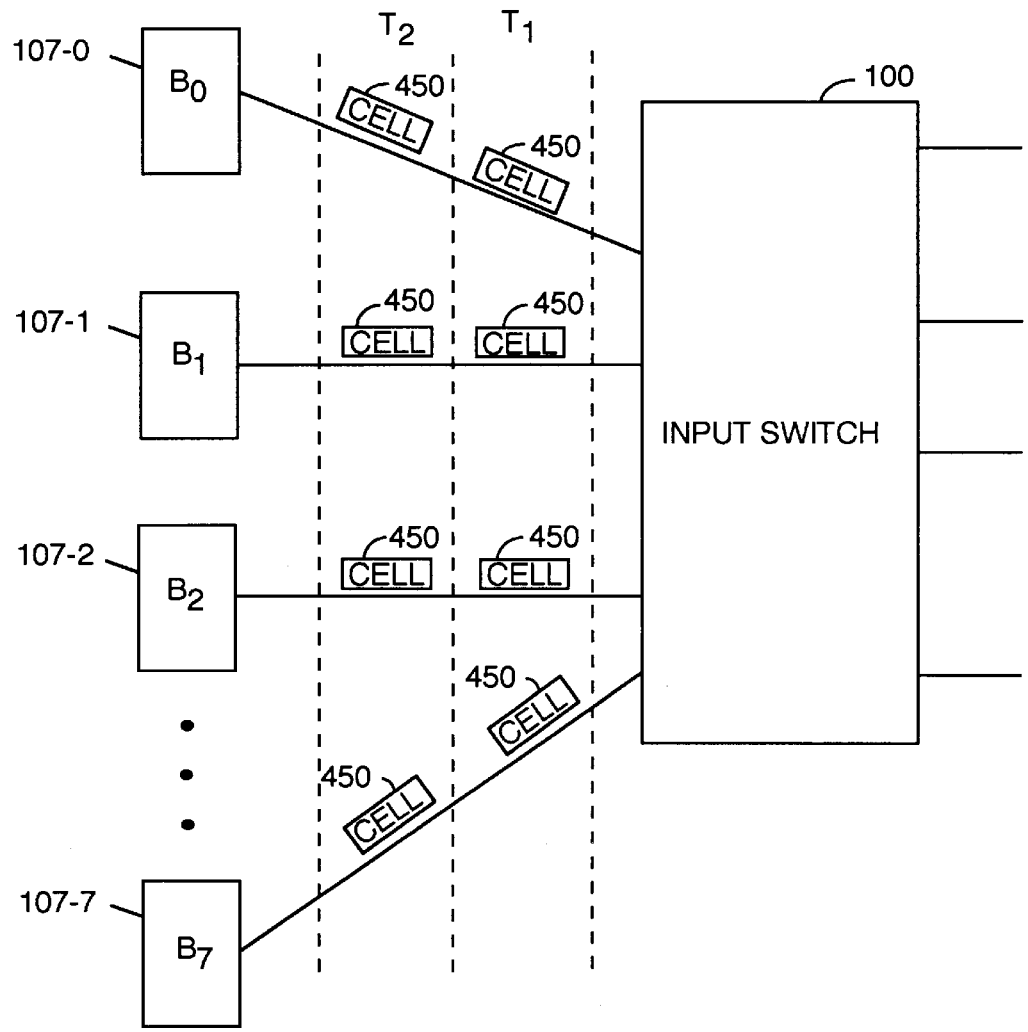
FIG. 4a is a schematic block diagram of a router including the timing and ordering of transfers from the input port to input switch according to one embodiment of the present invention.

Referring now to FIG. 4a, a single cell 450 is transferred from an input port 107 to input switch 100 at each cell slot "T". For a given cell slot "T", input port 107 receives a total of "N" cells, where "N" is equal to the number of input ports.

Figure 4B:
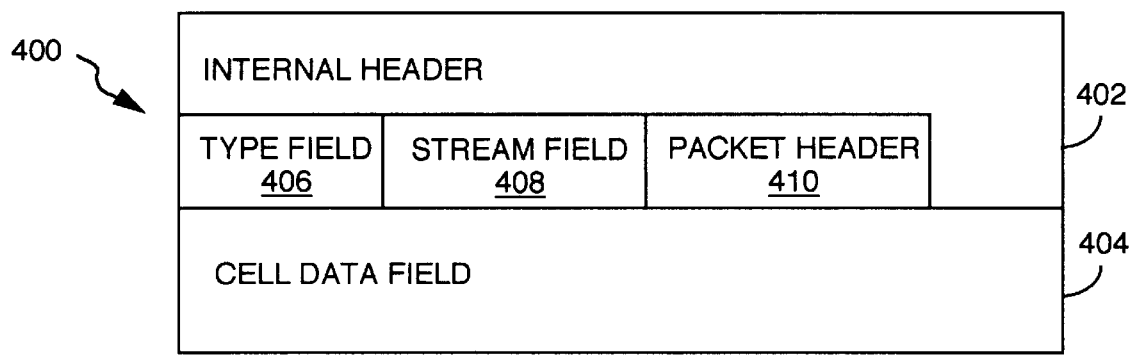
FIG. 4b is a data structure for a cell transferred between an input port and an input switch according to one embodiment of the present invention.

The data format for each cell 400 transferred from an input port 107 to input switch 100 includes an internal header 402 and a cell data field 404 as is shown in FIG. 4b. The internal header 402 includes a type field 406, stream field 408, and packet header fields 410.

The type field 406 indicates the type of cell to be transferred from the input port. At each cell slot (20 clock cycles in one embodiment), an input port may transfer either a data cell, an indirect cell placeholder, or a delayed indirect cell placeholder. Data cells contain data associated with an incoming packet. An indirect cell placeholder is an empty cell, and is used in conjunction with indirect addressing for the storage of the cells in the memory 104. Delayed indirect cell placeholders arise when a data stream that requires indirect addressing terminates at a time prior to the designated time for writing the last indirect addressing cell associated with the data stream to memory 104. The generation and operation of indirect placeholders and delayed indirect placeholders will be discussed in greater detail below in conjunction with FIG. 7.

Stream field 408 indicates the stream to which the cell data belongs. In one embodiment of the present invention, each input port is capable of handling up to sixteen separate streams of data at a time.

Packet header field 410 contains header information associated with a given packet and includes start offset information, packet length and interface index information.

Figure 5A:
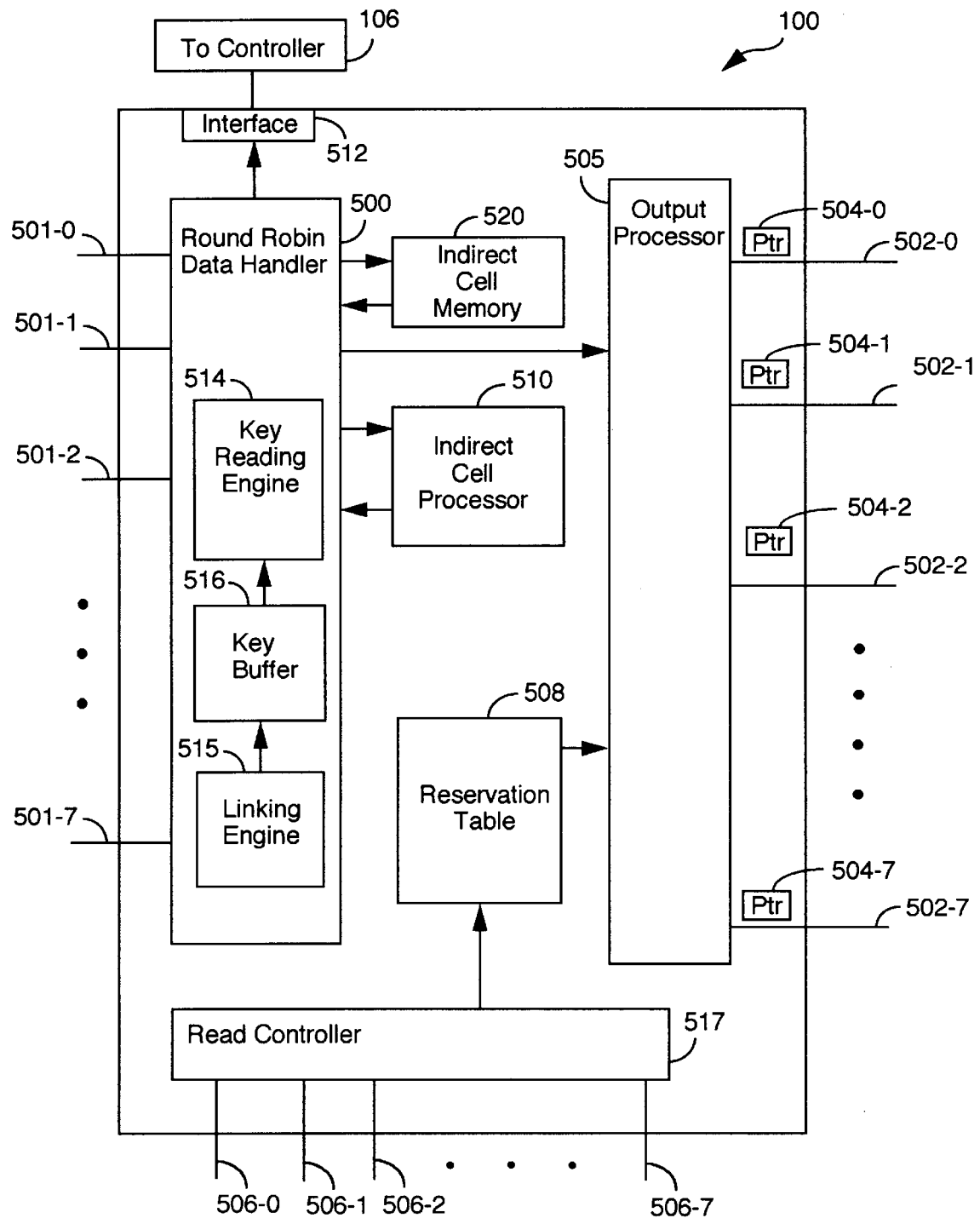
FIG. 5a is a schematic block diagram of an input switch according to one embodiment of the present invention.

Referring to FIG. 5a, input switch 100 includes a round robin data handler 500, one or more input port interfaces (501-0 through 501-7, one for each input port 107), one or more memory interfaces 502 (502-0 through 502-7, one associated with each memory bank), a like plurality of pointers 504 (504-0 through 504-7), an output processor 505, one or more output port interfaces 506 (506-0 through 506-7, one for each output port 108), a reservation table 508, an indirect cell processor 510, controller interface 512 and read controller 516.

Round robin data handler 500 receives cells from each input port and transfers them to output processor 505 for output to an appropriate memory bank 105 in memory 104. Round robin data handler 500 services the inputs (cells) received on input port interfaces 501 in a round robin, time division multiplexed manner. That is, for a given cell slot, one cell from each input port is received at the round robin data handler 500 and subsequently transferred to output processor 505 for transfer at the next cell slot to a memory bank 105 in memory 104. At the next time cell slot, data handler 500 transfers the next cell received from the same input port to output processor 505 for transfer to a different memory bank. In one embodiment, the next cell received is transferred to the next memory bank (next in numerical order) in the memory array. Alternatively, another time dependent permutation may be used to control the transfer of successive cells from the same input port.

Figure 5B:
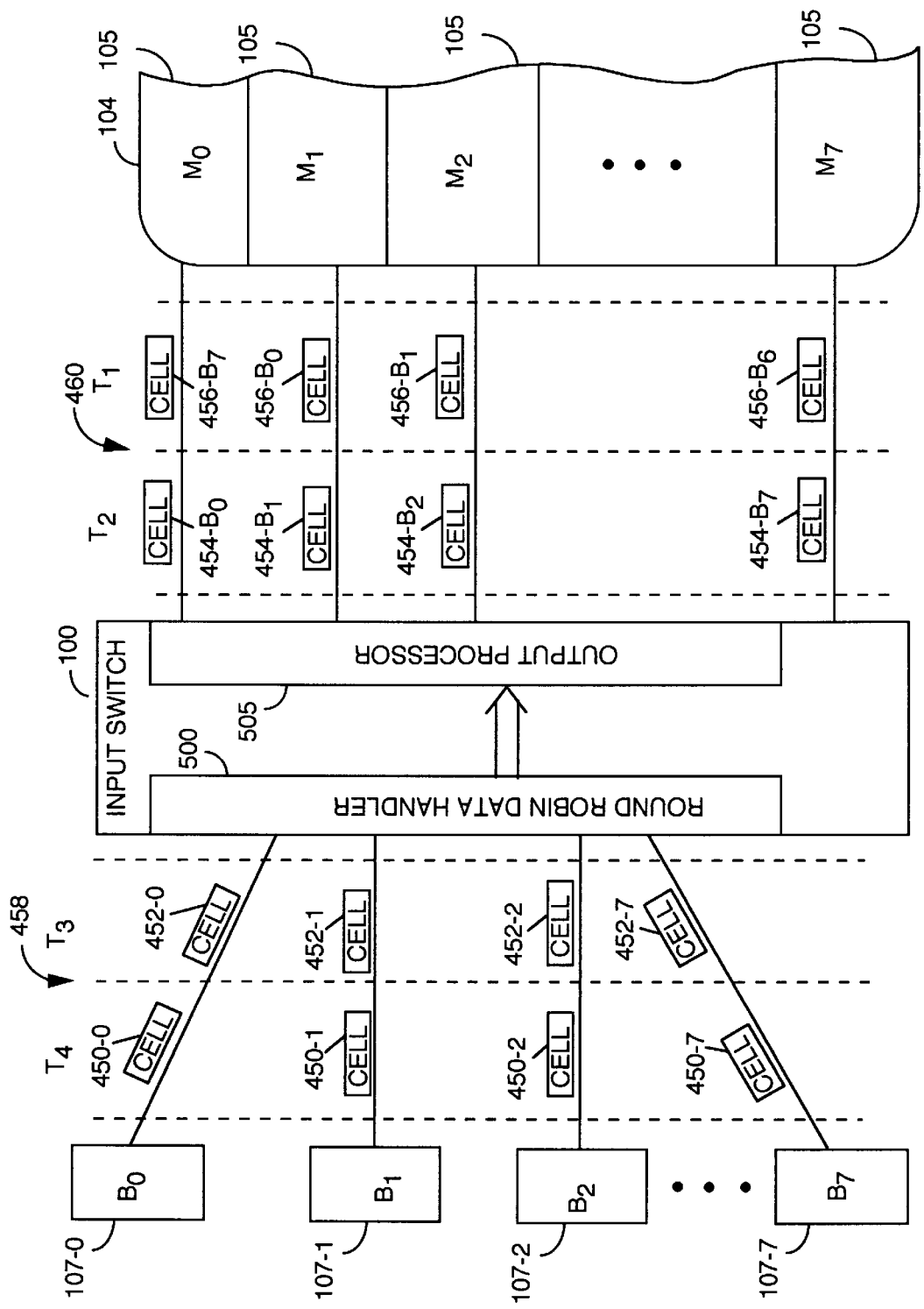
FIG. 5b is a schematic block diagram of a router including the timing and ordering of transfers from the input port to memory according to one embodiment of the present invention.

Referring to FIG. 5b, the timing and ordering of transfers from the input to memory is shown. For the purposes of this example, a sequence of cells is depicted on each transmission line. For the purposes of this example only each transmission line is considered to be very long and contains data associated with two or more cells. In operation, the transmission lines are short and multiple cells are not present on a transmission line at a given time. At cell slot T4 a series of cells 450-0 through 450-7 are transferred down transmission lines 458, one from each input port 107 to input switch 100. At cell slot T3 (one just prior in time to cell slot T4) a series of cells 452-0 through 452-7 are transferred down transmission lines 458, one from each input port 107 to input switch 100.

Round robin data handler 500 and output processor 505 within the input switch 100 transfer cells out to memory 104 on transmission lines 460. As can be seen at cell slot T2, output processor 505 outputs one cell 454-$B_0$ to 454-$B_7$ to each memory bank in a single cell slot. The "$B_x$" designator indicates the input port from which the particular cell was received. One cell from each input port is written to memory 104 per cell slot. At time period T1 (one cell slot prior to cell slot T2), again one cell (456-$B_0$ to 456-$B_7$) is written to each memory bank. Round robin data handler 500 time division multiplexes the transfers to output processor 505 such that consecutive cells from the same input port are written to consecutive memory banks 105 in memory 104.

Referring again to FIG. 5a, pointer 504 indicates the location in an associated memory bank to which the next cell will be written. Output processor 505 writes a cell to a memory location in a particular memory bank based on the next available address in the bank as is indicated by the associated pointer 504.

Round robin data handler 500 includes a key reading engine 514 for determining the key information associated with a first cell in a packet and a linking engine 515 for linking cells in the same packet.

Figure 6:
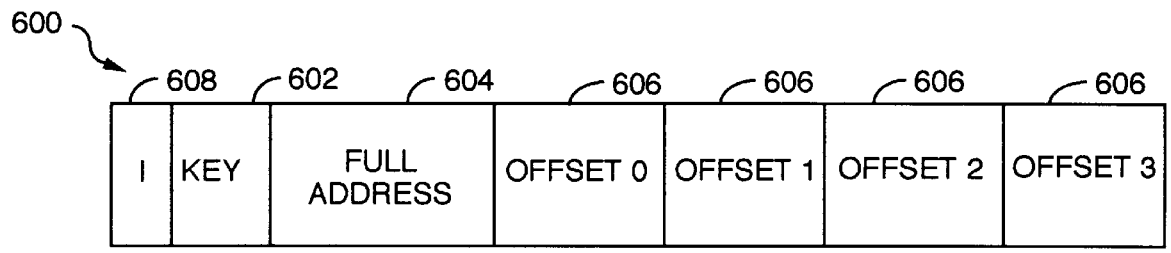
FIG. 6 is a data structure for a route request stored in a key buffer according to one embodiment of the present invention.

The process of reading key information is known in the art. After the key is determined for a given packet, it is stored temporarily in key buffer 516 in input switch 100 until the entire packet has been stored in memory 104. The data structure for entries 600 in the key buffer 516 is shown in FIG. 6. Each entry 600 includes a key 602, full address 604, offsets 606 and an indirect cell indicator 608.

Linking engine 515 determines the starting address (full address) in memory for the first cell in a given packet. The starting address includes the bank number in memory 104 (the bank number which is assigned to store the cell by round robin data handler 500) and the first available address location in the designated bank (as is indicated by the associated pointer 504). The starting address (full address 604) is stored in key buffer 516 along with the associated key 602 for the packet. When the next cell associated with the same packet arrives at switch 100, an offset 606 associated with the offset at which the cell is to be written (relative to the full address) is computed and stored in key buffer 516. In one embodiment of the present invention, up to four offsets 606 are stored. Each offset address is computed based on the relative offset in memory between the location of the last cell in memory and the value of the pointer 504 associated with the current memory bank which is to be written.

If more than five data cells are included in a packet, then the indirect cell indicator is set, and the last offset indicates the address in memory where the first indirect cell associated with the packet is stored. Indirect cells will be described in greater detail below in conjunction with FIG. 7. After the packet has been stored in memory, the associated entry in key buffer 516 (a route look-up request) is forwarded via the controller interface 512 to the controller 106 for processing. Alternatively, the key may be transferred after the first five cells have been stored in memory.

The linking or threading of cells for the same packet is performed by using the offsets described above and indirect cells. Offsets are used to link the first 5 cells in a packet, while indirect cells are used to link the remaining cells in a packet. In one embodiment, if a cell contains 5 cells or less, no indirect cells are required to be used. Indirect cell processor 510 performs the linking of cells in memory for a given packet. Indirect cell processor 510 generates indirect cells for storage in memory 104. Indirect cells contain offset information associated with the relative offset in memory space between contiguous cells in the packet. Indirect cell processor includes indirect cell memory 520 for storing indirect cell data during the formation of indirect cells.

Figure 7:
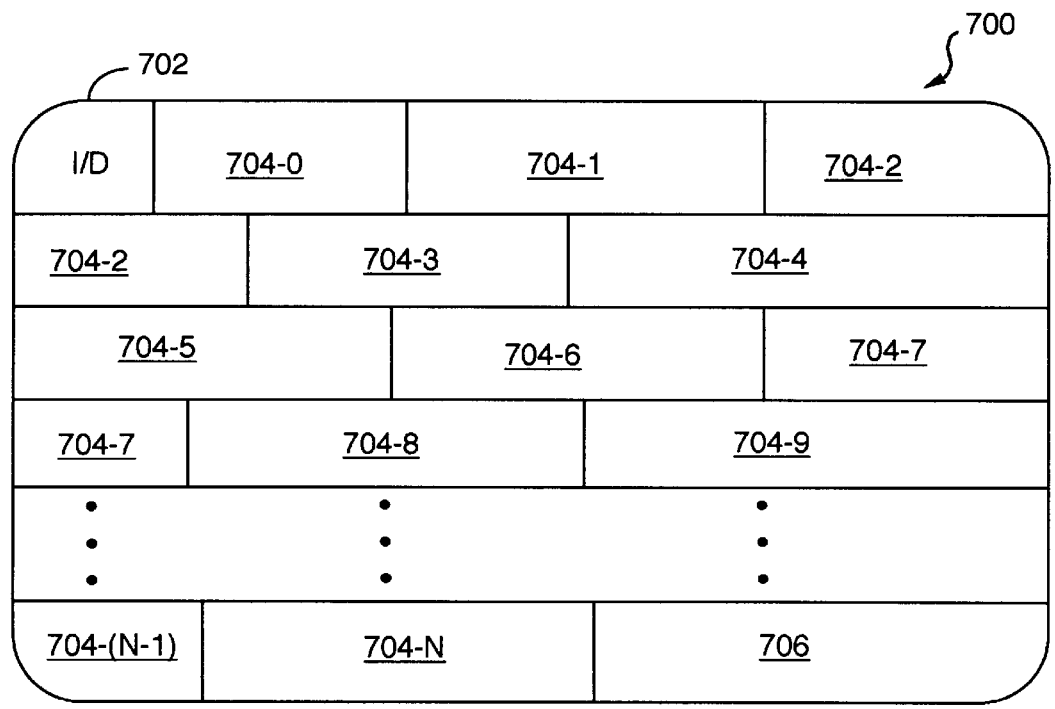
FIG. 7 is a data structure for an indirect cell according to one embodiment of the present invention.

Referring now to FIG. 7, the data structure for an indirect cell 700 includes a linking field 702, a plurality of offset fields 704, and a last field 706. Linking field 702, when not set, indicates the current indirect cell is the last cell in the chain of indirect cells for a given packet. If set, then more indirect cells exist for the given packet. If more indirect cells exist, then last field 606 indicates the offset to the location in memory of the next indirect cell associated with the packet. In one embodiment of the present invention, each indirect cell contains 56 offset data blocks for linking 56 cells in memory.

As was described above, when a packet is received, the linking engine processes the first five cells and stores linking information in the form of a start address and four offsets in key buffer 516. In the event more than five cells are contained within a packet, the indirect cell processor takes over for the linking engine and computes the offsets associated with the locations in memory where the remaining cells in the packet are stored. Round robin processor 500 passes cells to the output processor 505 for transfer to an associated memory bank in memory 104. Round robin processor 500 enables the indirect cell processor when the packet being processed contains more than 5 cells (based on header information included within the first cell). At the time for writing the fifth cell to memory, indirect cell processor 510 stores in indirect cell memory 520 the address (the "indirect cell address") associated with the location in memory at which the fifth cell would have been written if it had been the last cell in the packet. The indirect cell address indicates the location in memory where the indirect cell is to be written when it is full (or when the last cell of the packet is processed).

When a indirect cell is full (having stored offsets in all available locations except the last field 706), then the indirect cell processor stores the offset associated with the location in memory where the next indirect cell is located in the last field 606. Thereafter, the full indirect cell is written to its appropriate place in memory. The writing of the indirect cell to memory coincides with the receipt of an indirect cell placeholder by the input switch 100 from the associated input port 107. This process continues until the last cell in a packet is stored in memory. At that time, the last indirect cell is written to memory, and the associated entry 600 from the key buffer 516 is transferred to the controller 106 for processing.

As often will be the case, the last cell of a packet will not coincide with the timing required to write the completed indirect cell immediately into memory. This is because packet length is completely arbitrary. The end of a packet will likely not coincide with the filing of an entire indirect cell. When a packet has completed (all cells have been received by the input switch) and the last entry in the indirect cell is written, the indirect cell is free to be written to memory. However, the writing will be delayed until the proper time, hence the term delayed indirect cell. A delayed indirect cell is a indirect cell that is the last indirect cell associated with a packet. It is delayed, because it is written to memory after the rest of the packet has been written to memory. The timing of the write to memory is dictated by the address which is reserved for the indirect cell. As was described above, at the time for the creation of an indirect cell, its position in memory is reserved. The delayed indirect cell will be written to memory at the next time slot available for the particular input port to write to the particular memory bank after the packet has been completed. The timing of the write to memory of delayed indirect cells coincides with the receipt of a delayed indirect placeholder from the appropriate input port 107.

Read controller 517 controls the transfer of read request signals flowing from input switch 100 out memory interface 502 to the individual memory banks in memory 104. Read controller 517 receives read requests from each output port through output port interfaces 506. The format of each request includes source identification (output port) and a full address in memory which is to be read. At each cell slot, each output port may generate a read request for processing by switch 100 to read a memory location in memory 104, resulting in the reading of a cell (a read reply) from a memory bank 105 (on a subsequent cell slot) to output switch 102.

Figure 8:
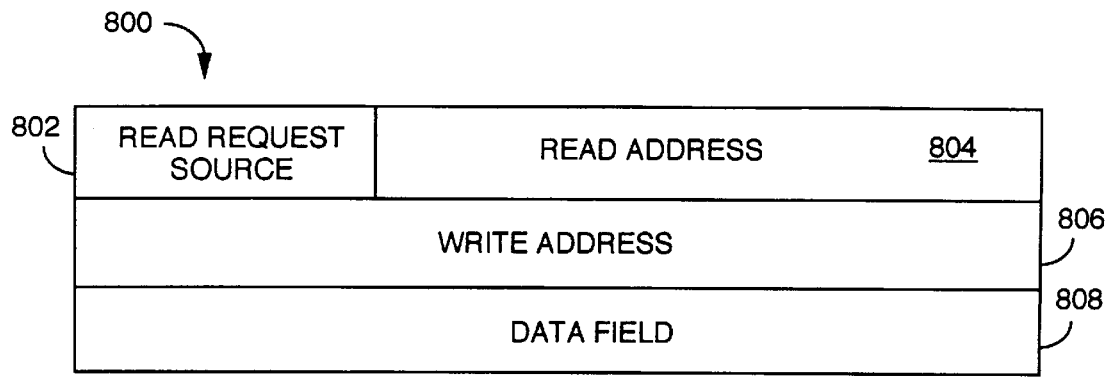
FIG. 8 is a data structure for a cell transferred between the input switch and a memory bank according to one embodiment of the present invention.

The data structure of a cell transferred from input switch 100 (via the output processor 505) to a memory bank 105 in memory 104 is shown in FIG. 8. At each cell slot, output processor 505 generates a cell 800 which includes a read request source field 802, read address 804, write address 806 and data field (cell data received from input port 107) 808. The read request source field 802 indicates the output port requesting the read (destination output port 108). Output processor 505 receives read requests from read controller 517 and bundles the read request with any write request received from round robin data handler 500 destined for the same memory bank. At each cell slot, output processor 505 provides a cell 800 which may include a write and read request to each memory bank 105 in memory 104.

Figure 9:
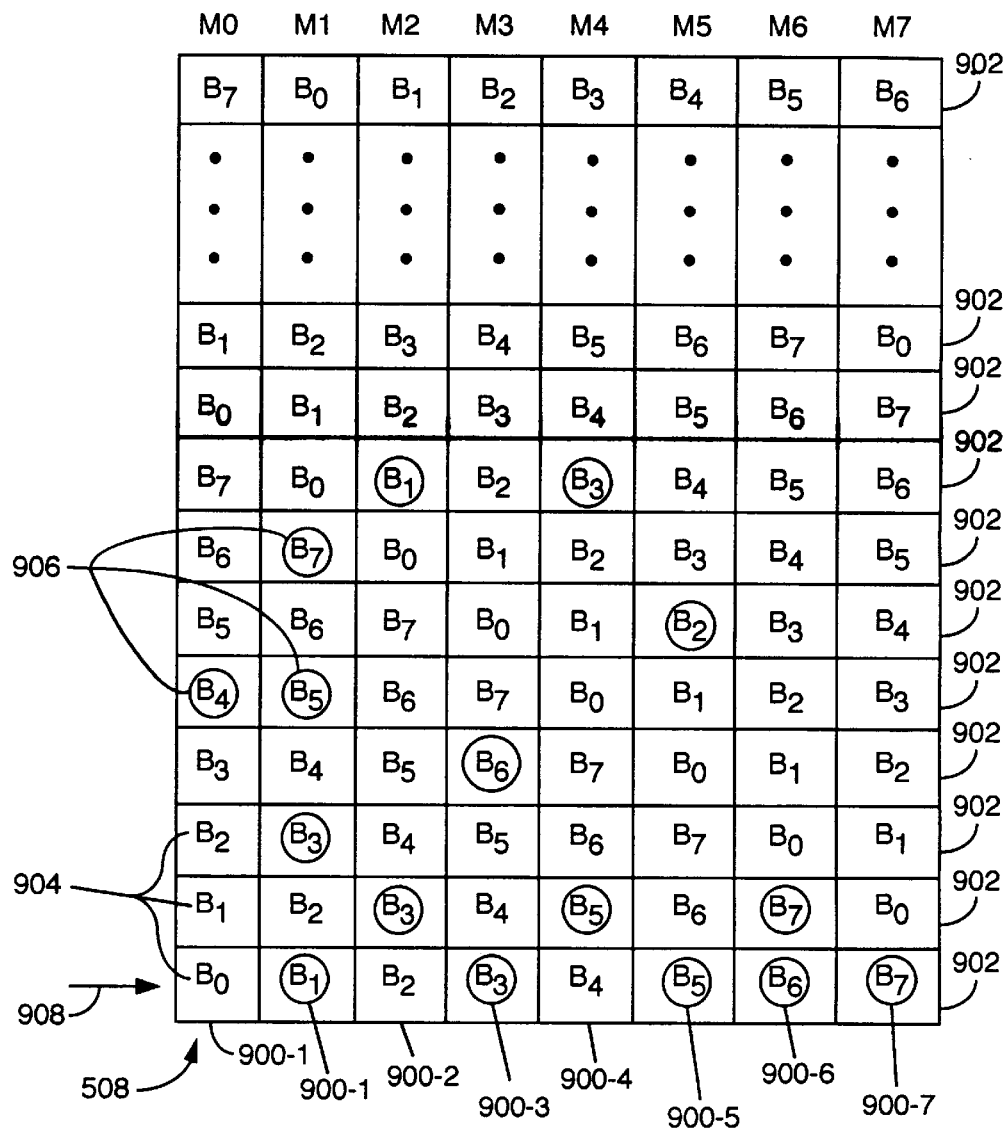
FIG. 9 is a schematic block diagram of a reservation table according to one embodiment of the present invention.

Read controller 517 loads a reservation table 508 as requests to transfer packets are received from the various output ports 108. The reservation table is loaded such that at every cell slot a single read request is generated for each bank of memory 105. Referring now to FIG. 9, reservation table 508 includes a plurality of columns 900, one for each memory bank 105 in memory 104, a plurality of rows 902, placeholders 904 and loaded entries 906. Each row represents a set of read requests (one per memory bank) to be generated on a single cell slot. Each row includes a single entry for each output port 108. At each cell slot, each output port is capable of requesting a read from a single memory bank 105 in memory 104. Associated with reservation table 508 is a read pointer 908. The pointer points to the next row in the reservation table to be read. Rows ahead of the read pointer correspond to requests that will be queued at a later cell slot time. In one embodiment, the pointer moves at least one row in each cell slot time.

Loaded entries 906 reflect read requests to be performed as a result of reservation requests received from output switch 102. Placeholders 904 represent available read requests which have not as of yet been requested. At each cell slot, the read controller 517 performs three functions: loading entries in the reservation table at the first available location in the table (after the read pointer) outputting the last row as read requests to the output processor 505; and refreshing the table, moving out the last row, incrementing the rows and creating a new row at the top of the table. The number of rows in the reservation table must be as large as the product of the latency in processing read requests times the number of banks. In one embodiment, 48 rows are included in reservation table 508 reflecting a system including six cell slots of latency and eight memory banks.

At initialization, reservation table 508 contains placeholders 904 in all of the rows 902. Placeholders 904 are locations in the reservation table which have not been loaded. As read requests are processed by the read processor, certain ones of the placeholders 904 are converted to loaded entries 906 based on the read requests. Loaded entries 906 include a read request address.

Figure 10:
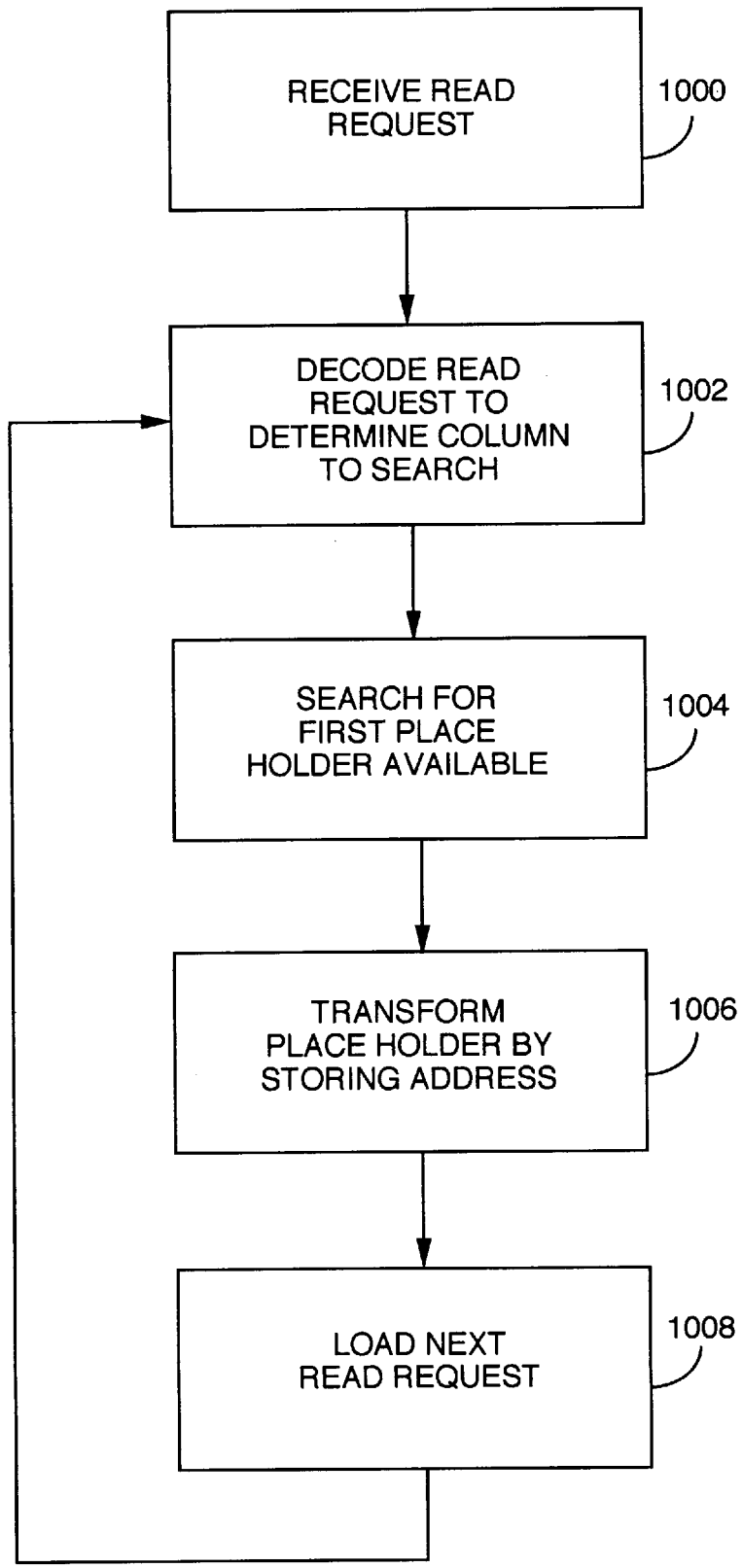
FIG. 10 is a flow diagram of a process of loading a reservation table according to one embodiment of the present invention.

Referring now to FIG. 10, the process of loading the reservation table includes receiving a read request (full address) from an output port (1000). The read controller decodes the read request to determine the column (based on the memory bank to be read from) in the reservation table to search (1002). The read processor searches, starting at the bottom of the reservation table, for the first placeholder associated with the output port that generated the read request (1004). The read processor transforms the placeholder 904 to a loaded entry 906 by writing the full address of the read request at the location (1006). The process repeats for each read request received by the read controller (1008).

Figure 11A:
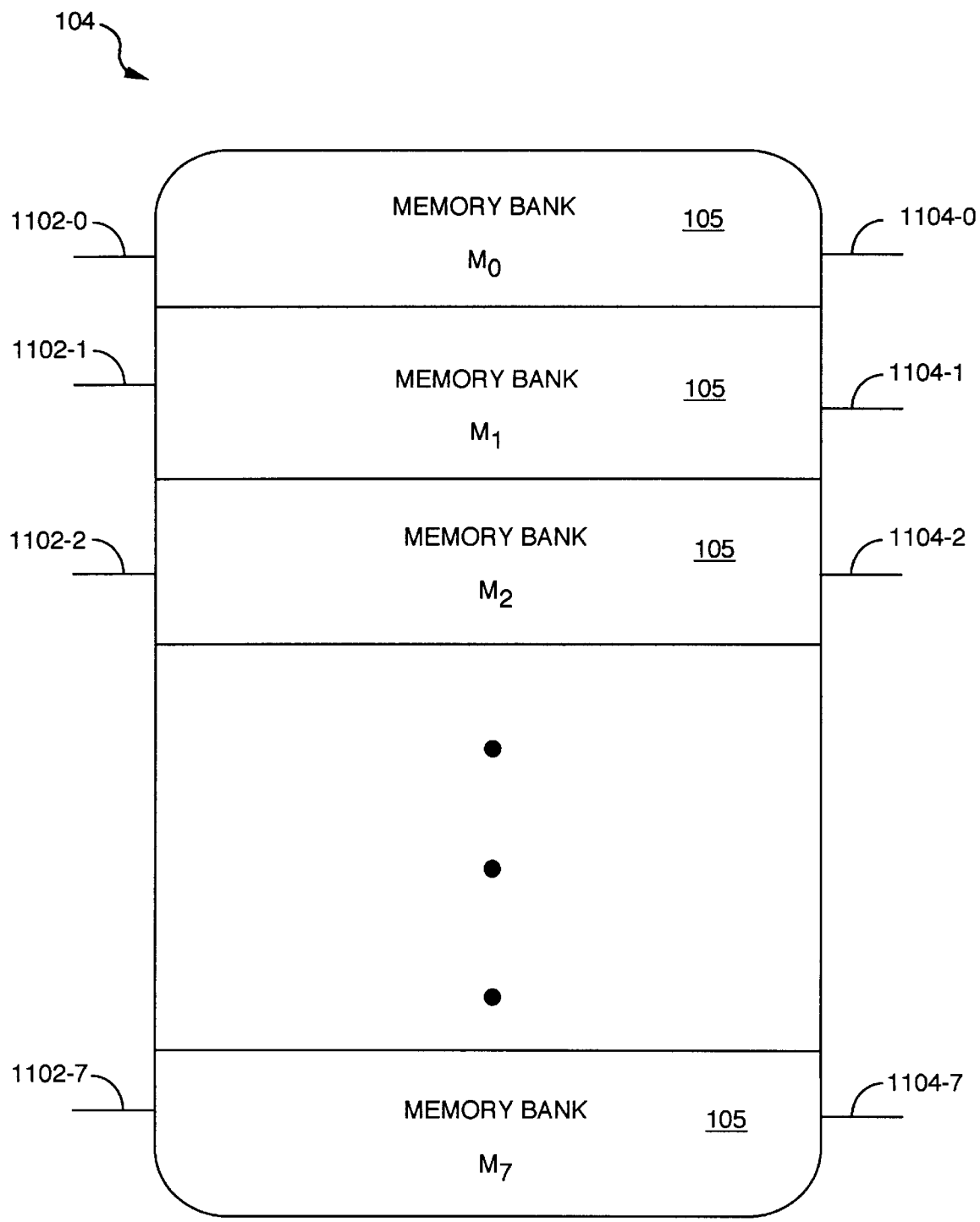
FIG. 11a is a schematic block diagram of a memory according to one embodiment of the present invention.
Figure 12:
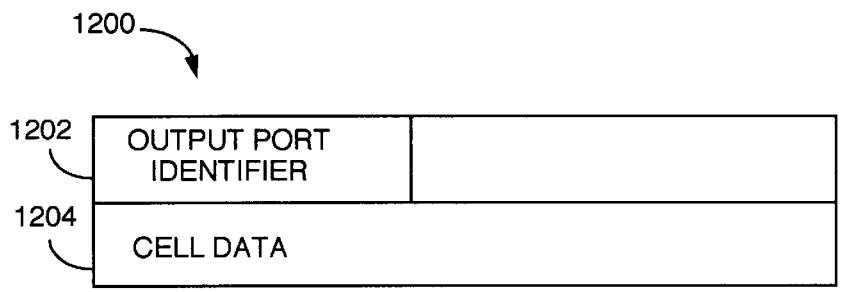
FIG. 12 is data structure for a cell output from a memory bank to output switch according to one embodiment of the present invention.

Referring now to FIG. 11, memory 104 includes a plurality of memory banks 105. Each memory bank includes a input port 1102 and output port 1104. At each cell slot, each memory bank receives at most one write and one read request via input port 1102. The write requests are associated with cells received from input ports 107. Read requests reflect a request for cell data to be transferred from a memory bank 105 to output switch 102. The data structure associated with the cells written from memory 104 to output switch 102 is shown in FIG. 12. Each cell 1200 includes an output port identifier 1202 and cell data 1204.

In one embodiment, the memory is divided into a plurality of banks where the number of memory banks is equal to the number of input and output ports. A one to one relationship exists between input ports, output ports and memory banks. In this embodiment, the transfer of cells from the input switch 100 to memory 104 is performed in a time division multiplex fashion. That is, consecutive cells from a given input port are directed to different memory destination locations. At each time period (cell slot), the input switch transfers to memory a single cell from each input port (as available) into memory. At a next time T+1 the input switch transfers again a single cell from each input port into memory. Successive entries from the same input port are written to different memory banks 105 in memory 104.

Figure 13:
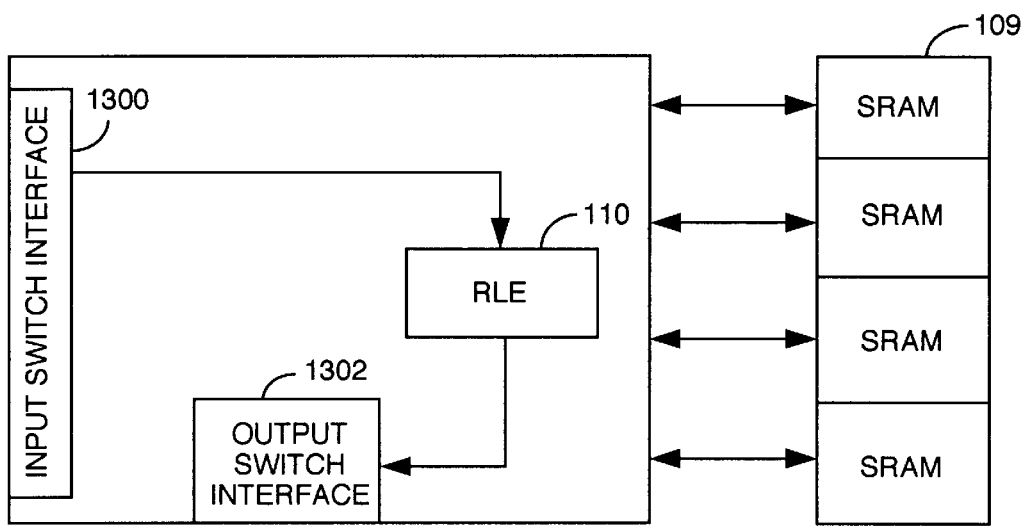
FIG. 13 is a schematic block diagram of a controller according to one embodiment of the present invention.

Referring now to FIG. 13, controller 106 includes controller memory 109, route look-up engine 110, input switch interface 1300, and output switch interface 1302. Controller 106 receives a route look-up request from input switch 100 at the input switch interface 1300. In one embodiment of the present invention a plurality of route look-up engines 110 are included in controller 106, each receiving look-up requests in round-robin fashion so as to speed the routing process. In one embodiment, controller memory 109 is a four bank static random access memory (SRAM) that requires thirty two route look-up engines 110 to service at full bandwidth. The matching of keys retrieved from a packet in order to determine a best match route through the router is described in greater detail in co-pending patent application entitled "HIGH SPEED VARIABLE LENGTH BEST MATCH LOOK-UP IN A SWITCHING DEVICE", filed on Dec. 16, 1996, by Fergusen et al., Ser. No. 08/767, 576, which is hereby expressly incorporated by reference.

The route look-up engine servicing the route look-up request performs a best match look-up and outputs notification through output switch interface 1302 to output switch 102. The notification includes a result which indicates the output port to be used in the transfer of the packet to its destination.

Figure 14:
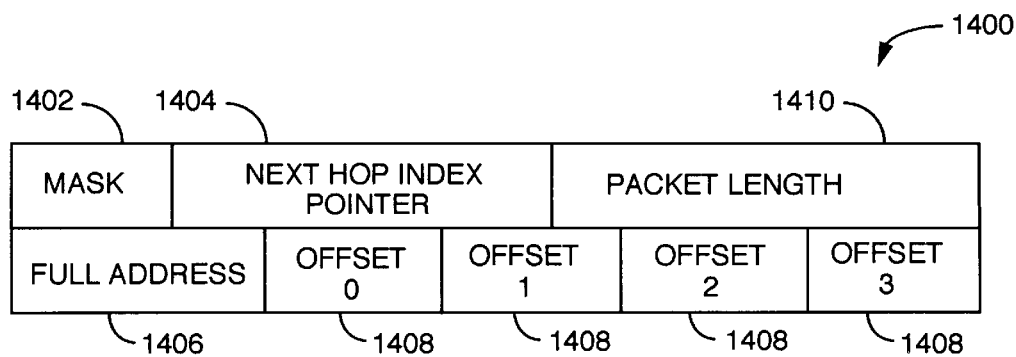
FIG. 14 is a data structure for an output request transferred from the controller to the output switch according to one embodiment of the present invention.

Referring now to FIG. 14, the data structure associated with the notification outputted by the controller 106 to the output switch 102 is shown. Th data structure 1400 for the notification includes a mask 1402, a next hop index pointer 1404, full address 1406, offsets 1408 and packet length 1410.

The mask field 1402 is used to indicate which output port connected to output switch 102 is to transfer the packet. In one embodiment, the notification may be sent to more than one output port resulting in the broadcast of the associated packet.

Associated with each output port 108 is a memory. The next hop index pointer points to a location in the memory. The memory is used to store media header information associated with a particular type of packet transfer. Next hop addresses and media headers will be described in greater detail below in association with output port 108.

The full address 1406 indicates the starting address in memory where the first cell in the packet is stored. As was described above, offsets 1408 provide linking information for retrieving cells or an indirect cell associated with the packet.

Figure 15:
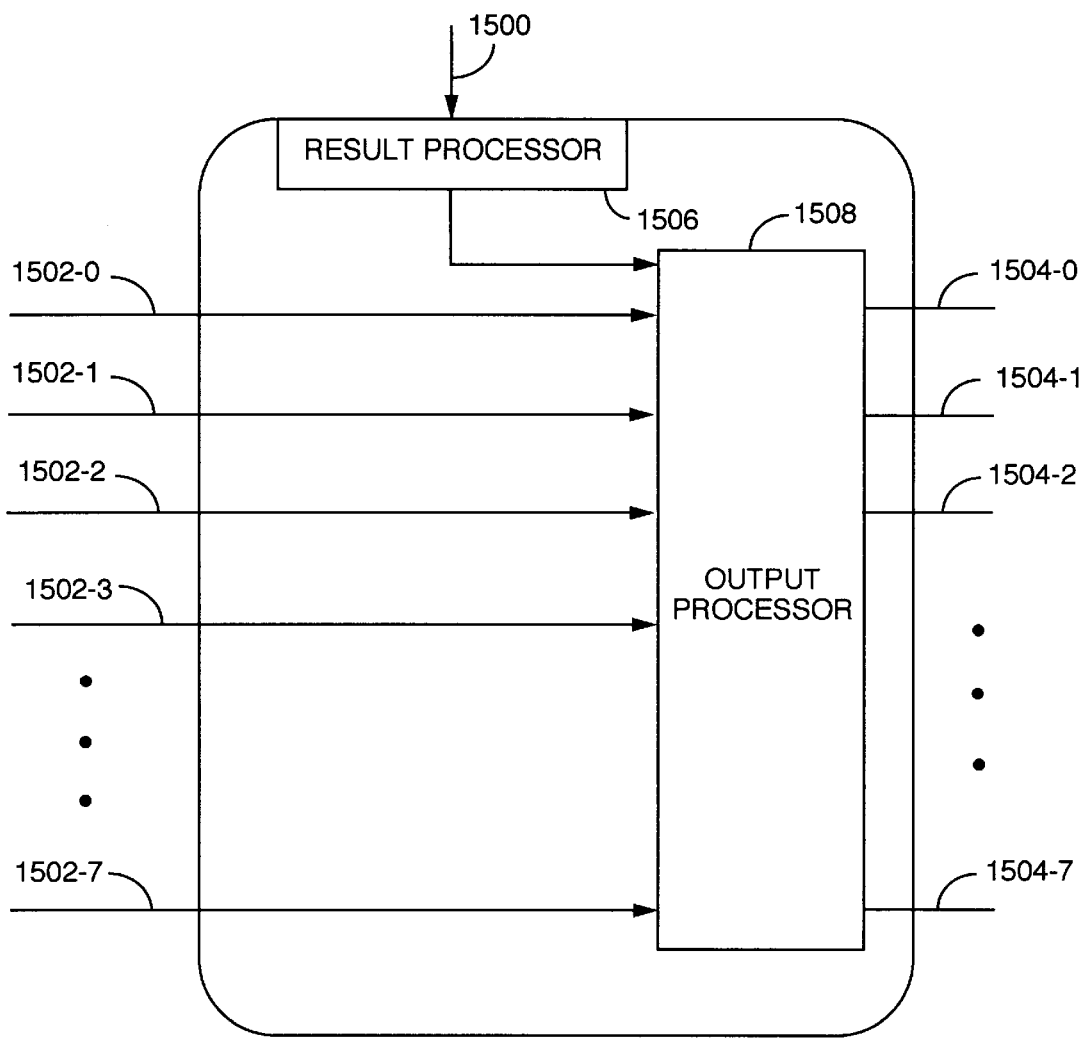
FIG. 15 is a schematic block diagram of an output switch according to one embodiment of the present invention.

Referring now to FIG. 15, output switch includes a controller interface 1500, one or more memory inputs 1502 (1502-0 through 1502-7, one for each memory bank), one or more outputs 1504 (1504-0 through 1504-7, one for each output port), a result processor 1506 and an output processor 1508. Output switch 102 performs four functions: receive output results, process output results, receive cells from memory and output cells to output ports.

Cells from memory are received at memory inputs 1502 and transferred to output processor 1508. Output processor 1508 decodes the destination output port from the cell information received from memory and transfers the cell data to the appropriate outputs 1502. At each cell slot, output switch 102 receives a cell for processing from each bank in memory 104.

Output switch 102 receives notification from controller 106 on controller interface 1500. Result processor 1506 decodes the result (route) and determines which output port(s) 108 is (are) to receive the route data. Based on mask 1402 in the notification, result processor 1506 transfers the notification to output processor 1508 for transfer to each respective output port 108 so indicated. At each cell slot, output processor 1508 provides (via outputs 1504) a route to each output port 108.

Figure 16:
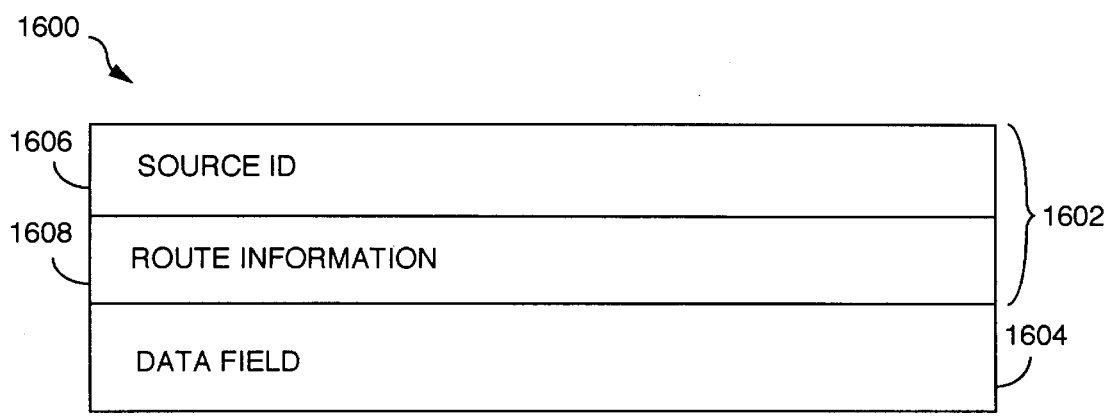
FIG. 16 is a data structure for a cell transferred from the output switch to an output port according to one embodiment of the present invention.

The data structure associated with the data transferred from output processor 1508 to output ports 108 is shown in FIG. 16. A cell 1600 includes a header 1602 and data field 1604. The header 1602 includes memory bank source information 1606 and route information 1608. The memory bank source information includes a source identifier for indicating which memory bank provided the cell in data field 1604. Route information 1608 contains data from the notification including a next hop index, packet length, full address and offsets.

Figure 17:
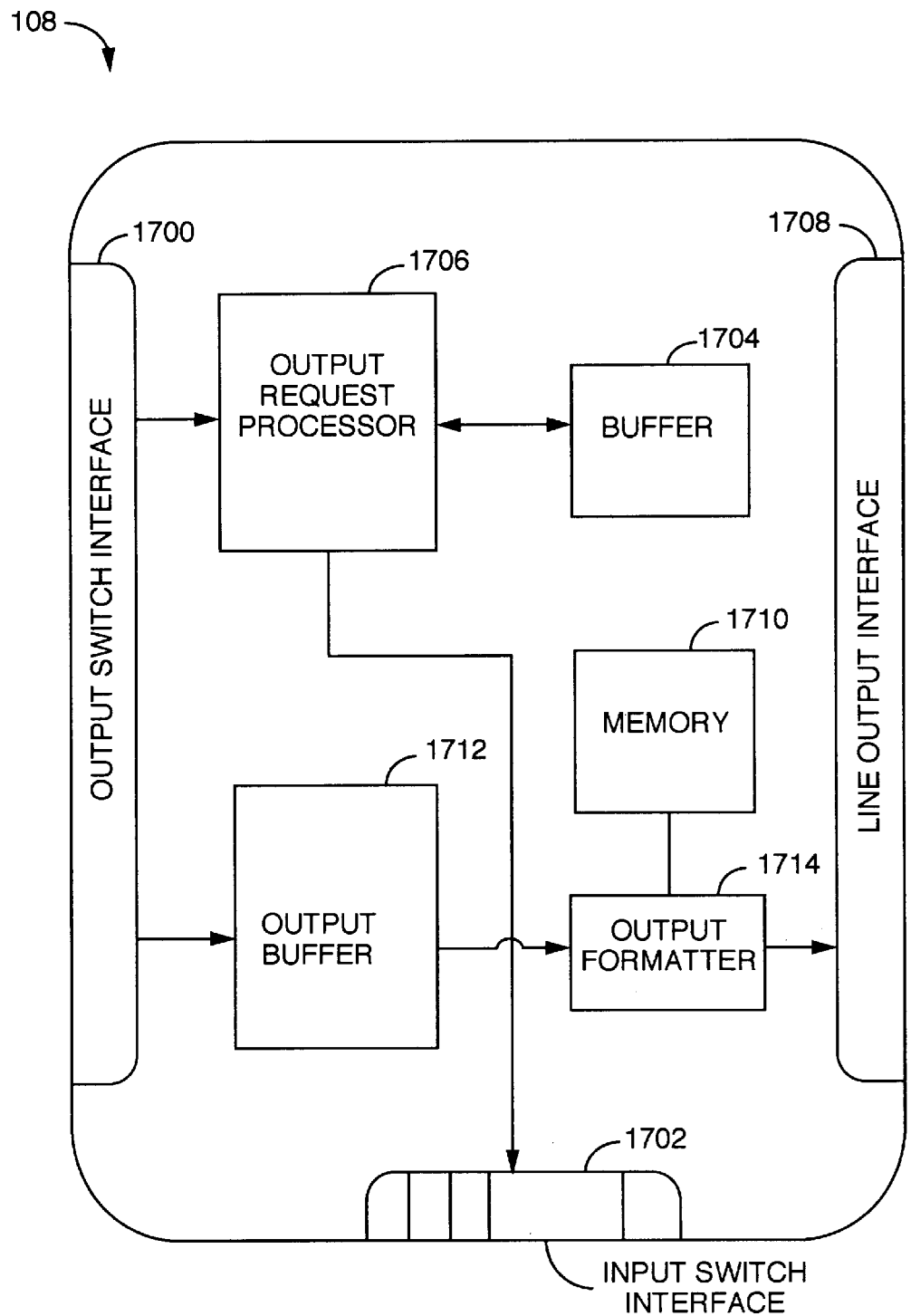
FIG. 17 is a schematic block diagram for an output port according to one embodiment of the present invention.

Referring now to FIG. 17, each output port 108 includes an output switch interface 1700, an input switch interface 1702, a buffer 1704, an output request processor 1706, an line output interface 1708, storage device (memory) 1710, output buffer 1712 and output formatter 1714.

Output ports 108 receive notification that a packet is to be processed by cells 1600 received at the output switch interface 1700. The output request processor 1706 stores the request in buffer 1704 and subsequently generates a read request to input switch 100 associated with the first address in memory where the packet is stored. The output request processor 1706 generates the first read request based on the full address received from output switch 102. Thereafter subsequent read requests are generated for transmission to the input switch based on the offset information provided in the request (from cell 1600) or indirect cells (as will be described below).

If the packet length, as determined from the route information provided with the cell 1600, is greater than five (5) cells, then the output request processor first requests the transfer (read from memory) of the first indirect cell associated with the packet. This is accomplished by computing the address of the indirect cell based on the full address and the offsets provided in cell 1600. After the indirect cell request is generated, the output request processor generates read requests for the remaining cells in the packet based on the full address and the offsets provided in cell 1600. Upon receipt of a indirect cell from the output switch 102, output request processor continues to generate read requests for the remaining cells in the packet based on the offset information contained within the indirect cell.

Subsequent indirect cells are retrieved in a similar fashion. That is, at the time for reading the next indirect cell, the address of the next indirect cell is computed based on the last offset stored in the previous indirect cell. The timing of retrieving the indirect cells is accomplished such that no delays in the output stream are required. Each subsequent indirect cell is retrieved prior to the end of the processing of the prior indirect cell. In this way, once the output stream is initialized, no buffering of data is required and no interruptions due to the latency associated with the retrieval process are experienced.

Output requests to an individual memory bank are processed strictly in order. That is, output port may track each request issued to a memory bank and is assured that the data received in response to a series of requests to the same memory bank will be strictly delivered according to the sequence or pattern which they were issued. Output request processor keeps track of requests generated for each memory bank. Output buffer 712 includes a plurality of queues, two for each memory bank (one request queue and one reply queue), that are used to order cells received from memory according to the particular stream to which they are assigned. The request queue contains a stream number and a read address. When a request is issued to memory, the entry is removed from the request queue and the stream number portion is placed in the reply queue. When a reply is received, the entry at the head of the reply queue is removed and the reply is sent to the stream number indicated by the stream number retrieved from the reply queue.

As cells are received back at the output port 108 (responsive to the read requests), they are stored in output buffer 1712. For given packet, the output port stores the number of cells required to provide a streamed output. In one embodiment of the present invention, twelve cells are stored prior to beginning to output (stream data) from the output port. The selection of the number of cells for storage in output buffer 1712 is based on the latency in the read process (number of clock cycles between a read request from an output port and the arrival of the cell associated with the read request to the output port).

Output formatter 1714 receives the cells from output buffer 1712 and couples the data with media header information stored in memory 1710. Each request (notification) received from output switch 102 includes a next hop index. The next hop index indicates the starting address in memory 1710 of the media header information associated with a given type of transmission (derived from the destination of the packet). Output formatter 1714 couples the cell data returned from memory with the appropriate media header to generate a proper packet for transfer out of router 20 on the line output interface 1708.

Figure 18:
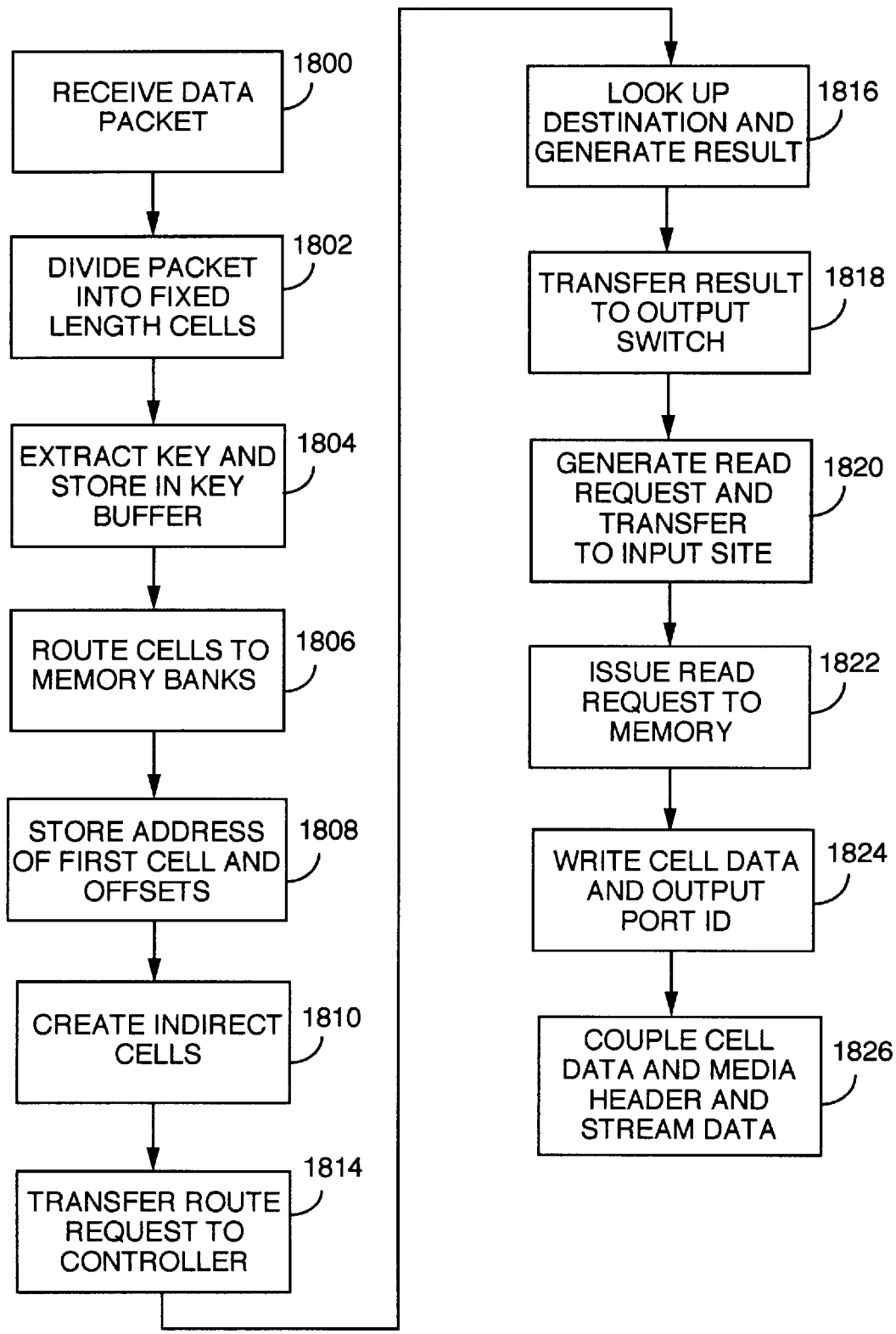
FIG. 18 is a flow diagram for a process of routing a packet through a router according to one embodiment of the present invention.

Referring now to FIG. 18, in a method of routing packets through a switch a packet is received at an input port (1800). The input port divides the packet into fixed length cells and transfers the cells to an input switch (1802). Input switch removes the key information from the first cell in a packet and stores it temporarily in a key buffer (1804). Thereafter the input switch routes the cells to memory banks in a time division multiplexed manner (1806). The input switch stores the first address associated with where the first cell is written in memory and computes offsets for each additional cell associated with the offset in memory for the next contiguous memory bank into which the next cell is written (1808). The input switch creates indirect cells to store linking information for the packet if the packet length exceeds five cells (1810). If the number of cells exceeds the number of available offsets in an indirect cell, then the old indirect cell is stored in memory and a new indirect cell is created and loaded based on the offsets calculated for each new cell received at the input switch.

When the packet (and its indirect cells if any) have been stored in memory, then the key, full address of the first cell and offset information is transferred as a look-up request to a controller (1814). The controller performs a best match look-up and generates a result of the look-up. The result which includes the destination port (output port), address, offset information and next hop index (1816). A notification including the result is transferred to the output switch for transfer to the appropriate output port (1818).

Upon receipt of a notification, the output port generates read requests a cell at a time to the input switch for the data associated with the packet (1820). The input switch issues the read requests in a time division multiplexed fashion generating a single request to each memory bank per cell slot (1822). When the memory bank receives the request from the input switch, the output port associated with the request and the cell data is written to the output switch (1824). Again, at each cell slot, the output switch transfers a single cell to each of the output ports. Upon receipt, the output port couples the cell data with media header information and streams the data to the destination (1826).

Alternative Embodiments

Figure 19:
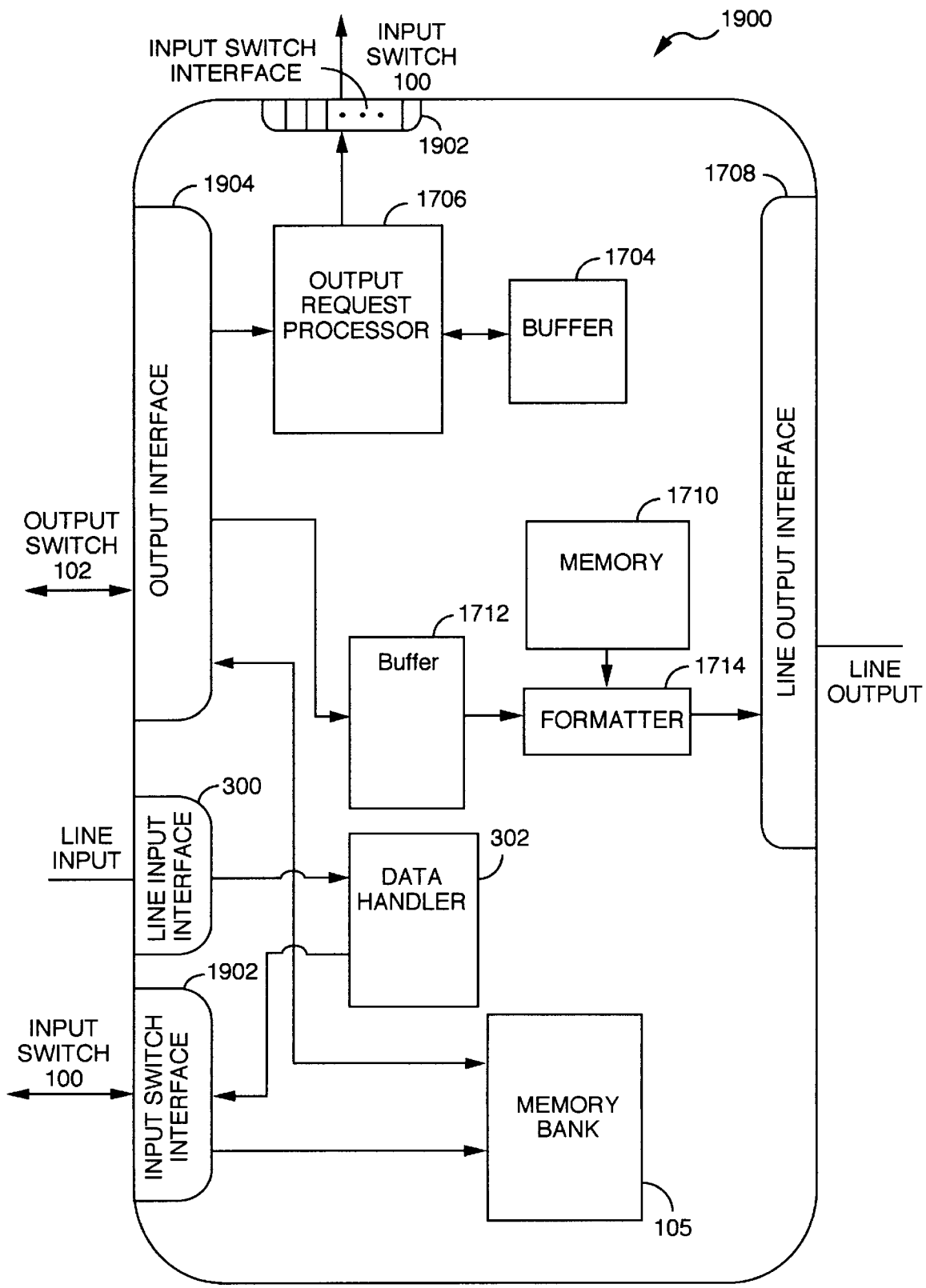
FIG. 19 is a schematic block diagram of a router according to one embodiment of the present invention including sequence flow information for following the flow of operations performed by the router in routing a packet from an input port to its appropriate output port.

In one embodiment of the present invention, an output port, an input port and a memory bank are contained in a single device. The architecture of this multifunction port including memory is shown in FIG. 19. Specifically, the multifunction port 1900 includes a memory bank 105, a line input interface 300, a data handler 302, a buffer 1704, output request processor 1706, a line output interface 1708, a storage device 1710, a FIFO 1712, output formatter 1714, an input switch interface 1902 and an output switch interface 1904.

Figure 20:
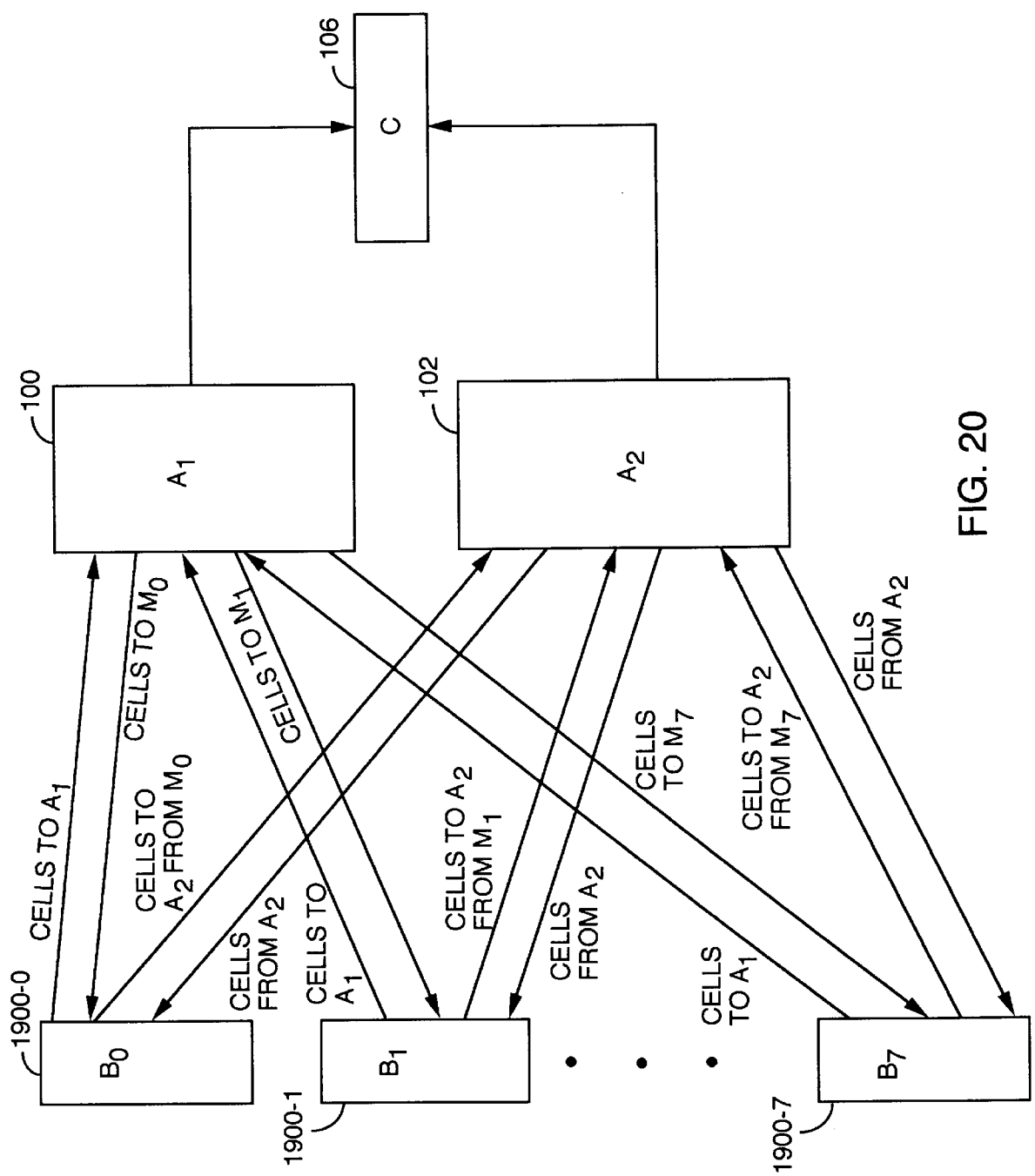
FIG. 20 is a schematic block diagram of a multi-function port according to one embodiment of the present invention.
Figure 21:
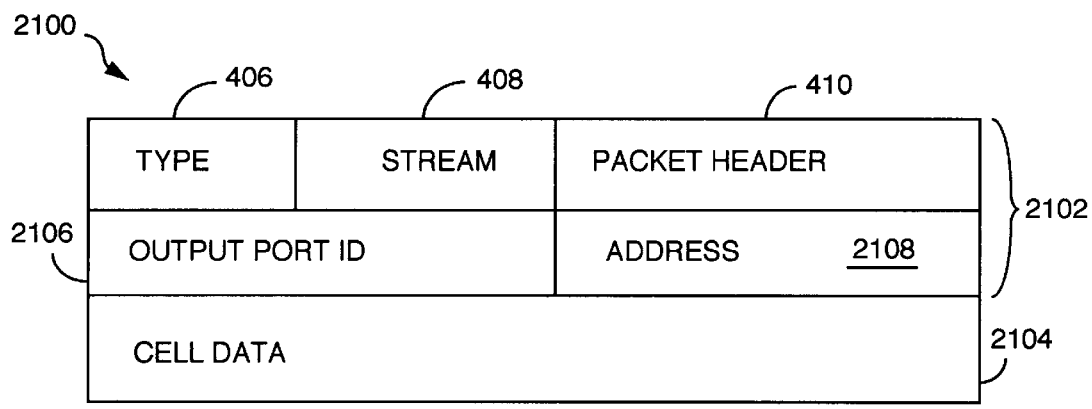
FIG. 21 is a schematic block diagram of a router including multi-function port according to one embodiment of the present invention.

The multifunction port is used in conjunction with the input switch, output switch and controller as is shown in FIG. 20. The various piece components of the input port, output port and memory bank perform the identical functions described above. However, the combination of the devices into a single unit simplifies the interfaces between the components. Specifically, the revised format for transfers between the multifunction port and the input switch is shown in FIG. 21.

A cell 2100 transferred from a multifunction port 1900 to the input switch contains a cell header 2102 and cell data 2104. Cell header 2102 includes a type field 406, stream field 408, and packet header fields 410 similar in function to those fields described above in reference to FIG. 4. In addition, cell header 2102 includes a read request in the form of a output port identifier 2106 and address 2108. Output port identifier 2106 identifies the output port which is sourcing the read request. Address 2108 indicates the address in memory 104 to be read.

The present invention has been described in terms of specific embodiments, which are illustrative of the invention and not to be construed as limiting. Other embodiments are within the scope of the following claims.

What is claimed is:

1. A router for switching a data packet between a source and destination in a network comprising:
    an input port including a data handler, the input port receiving the data packet from the source, the data handler dividing the data packet into one or more fixed length cells;
    an output port for routing the data packet to the destination;
    a memory divided into a plurality of memory banks;
    an input switch for receiving the fixed length cells from the input port and routing consecutive cells of the data packet to different memory banks, wherein a single cell is transferred in a cell slot time span to a memory bank; and
    an output switch for routing cells received from the memory to the output port.

2. The router of claim 1 where the input switch includes a linking engine for linking cells in the data packet to allow retrieval of the data packet from non-contiguous locations in the memory.

3. The router of claim 2 further including an indirect cell generator for generating one or more indirect cells, the linking engine tracking the location in the memory where consecutive cells of the data packet are stored and providing an address in memory of each cell in the data packet for storage in indirect cells.

4. The router of claim 1 wherein the input switch time division multiplexes the writing of data packets to the memory such that consecutive cells from the input port are written to consecutive banks in the memory.

5. The router of claim 1 wherein the input switch includes a key reading engine for extracting key information from a first cell received at the input switch associated with the data packet, the router further including a controller coupled to the input switch and receiving the key information therefrom, the controller for decoding destination information from the key information received from the input switch and outputting a notification defining a routing of the data packet from the memory to the output port.

6. The router of claim 5 wherein the output port includes a result processor for receiving the notification from the controller and initiating a transfer of the data packet from the memory to the output port.

7. The router of claim 1 wherein the input switch includes a reservation table for scheduling transfers from the memory to the output switch.

8. The router of claim 7 further including a controller coupled to the input switch and the output switch for decoding destination information received from the input switch and outputting a notification to the output switch defining a routing of the data packet from the memory to the output port.

9. The router of claim 8 wherein the output switch routes the notification to the output port and thereafter the output port issues a request to the input switch to transfer the data packet from memory to the output port through the output switch.

10. The router of claim 9 wherein the request from the output port is stored in the reservation table.

11. The router of claim 10 wherein requests to transfer cells from memory to the output switch are time domain multiplexed so that during one cell slot time span at most a single read request is issued to each bank in the memory for servicing.

12. The router of claim 9 wherein the memory outputs at most a single cell per bank in one cell slot time span.

13. A router for switching a data packet between a source and destination in a network comprising;
    an input port for receiving a data packet from the source, the input port including a data handler for dividing the data packet into fixed length cells;
    a memory divided into a plurality of memory banks;
    an input switch including a linking engine, the input switch receiving at most a single cell from the input port in a cell slot time span and routing at most a single cell from the input port to the memory in a cell slot, the input switch time division multiplexes writing of cells to the memory such that consecutive cells from the input port are written to consecutive banks in the memory, the linking engine for linking cells in the data packet to allow retrieval of the data packet from non-contiguous locations in the memory;
    a controller for decoding destination information associated with the data packet, the controller outputting a notification defining a routing of the data packet through the router;
    an output port including a result processor for receiving the notification from the controller and initiating a transfer of the data packet from memory to the output port; and
    an output switch for routing cells received from the memory to the output port.

14. A router for switching a data packet between a source and destination in a network comprising:
    a plurality of input ports each including a data handler, a first input port receiving the data packet from the source, the data handler of the first input port dividing the data packet into one or more fixed length cells;
    a plurality of output ports at least one of which is for routing the data packet to the destination;
    a memory divided into a plurality of memory banks;
    an input switch for receiving fixed length cells from one or more input ports and routing consecutive cells of the data packet to different memory banks, wherein a single cell is transferred in a cell slot time span to a memory bank; and
    an output switch for routing cells received from the memory to an appropriate output port.

15. The router of claim 14 where the input switch includes a linking engine for linking cells in the data packet to allow retrieval of the data packet from non-contiguous locations in the memory.

16. The router of claim 15 further including a indirect cell generator for generating one or more indirect cells, the linking engine tracking the location in the memory where consecutive cells of the data packet are stored and providing an address in the memory of each cell in the data packet for storage in indirect cells.

17. The router of claim 14 wherein the input switch time division multiplexes the writing of cells to the memory such that consecutive cells from any input port are written to different banks in the memory.

18. The router of claim 14 wherein the input switch includes a key reading engine for extracting key information from a first cell received at the input switch associated with the data packet, the router further including a controller coupled to the input switch and receiving the key information therefrom, the controller for decoding destination information from the key information received from the input switch and outputting a notification defining a routing of the data packet from the memory to an appropriate output port.

19. The router of claim 18 wherein the output port includes a result processor for receiving the notification from the controller and initiating a transfer of the data packet from the memory to the appropriate output port.

20. The router of claim 14 wherein the input switch includes a reservation table for scheduling transfers from the memory to the output switch.

21. The router of claim 20 further including a controller coupled to the input switch and the output switch for decoding destination information received from the input switch and outputting a notification to the output switch defining a routing of the data packet from the memory to the appropriate output port.

22. The router of claim 21 wherein the output switch routes the notification to the output port and thereafter the output port issues a request to the input switch to transfer the data packet from memory to the appropriate output port through the output switch.

23. The router of claim 22 wherein the request from the output port is stored in the reservation table.

24. The router of claim 23 wherein requests to transfer cells from memory to the output switch are time domain multiplexed so that during one cell slot time span at most a single read request is issued to each bank in the memory for servicing.

25. The router of claim 22 wherein the memory outputs at most a single cell per bank in one cell slot time span.

* * * * *